United States Patent
Yang et al.

(10) Patent No.: US 10,572,754 B2
(45) Date of Patent: Feb. 25, 2020

(54) AREA OF INTEREST BOUNDARY EXTRACTING METHOD AND APPARATUS, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Yehui Yang, Beijing (CN); Yuan Xia, Beijing (CN); Haishan Wu, Beijing (CN); Chao Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 62 days.

(21) Appl. No.: 15/910,958

(22) Filed: Mar. 2, 2018

(65) Prior Publication Data

US 2018/0260648 A1 Sep. 13, 2018

(30) Foreign Application Priority Data

Mar. 9, 2017 (CN) .......................... 2017 1 0138011

(51) Int. Cl.
*G06K 9/00* (2006.01)
*G06K 9/32* (2006.01)
(Continued)

(52) U.S. Cl.
CPC ....... *G06K 9/3233* (2013.01); *G06K 9/00651* (2013.01); *G06K 9/4604* (2013.01); *G06K 9/6256* (2013.01); *G06K 9/6288* (2013.01)

(58) Field of Classification Search
CPC ............. G06K 9/3233; G06K 9/00651; G06K 9/4604; G06K 9/4628; G06K 9/6256; G06K 9/6273; G06K 9/6288; G06K 9/6289; G06F 16/2365; G06F 16/29; G06F 16/955; G06F 16/9537; G01C 21/3667; G01C 21/32;
(Continued)

(56) References Cited

U.S. PATENT DOCUMENTS

2010/0020066 A1* 1/2010 Dammann .............. G06T 19/00
                                                          345/419
2017/0249496 A1* 8/2017 Fentzke ............. G06K 9/00657
(Continued)

*Primary Examiner* — Jose L Couso
(74) *Attorney, Agent, or Firm* — Ladas & Parry, LLP (57) ABSTRACT

The present disclosure provides an area of interest boundary extracting method and apparatus, a device and a computer storage medium, wherein the area of interest boundary extracting method comprises: obtaining a satellite image and a road network base map including an area of interest; merging the obtained satellite image and road network base map to obtain merged data; using a binarizing model to perform binarization for the merged data to obtain a binarized image, wherein the binarizing model is obtained by training according to training data in advance; extracting a boundary of the binarized image as the boundary of the area of interest. According to the present disclosure, the boundary extracting costs are reduced and automatic and accurate extraction of the boundary of the area of interest is implemented by obtaining the satellite image and the road network base map including the area of interest, and inputting the data formed by merging the satellite image with the road network base map into the binarizing model.

21 Claims, 8 Drawing Sheets

(51) Int. Cl.
*G06K 9/46* (2006.01)
*G06K 9/62* (2006.01)

(58) Field of Classification Search
CPC .. G01C 21/203; G01C 21/30; G01C 21/3611; G01C 21/3679; G01C 21/005; G01C 21/20; G01C 21/26; G01C 21/34; G01C 21/3476; G01C 21/3602; G01C 21/3635; G01C 21/3644; G01C 21/367; G01C 21/3673; G01C 21/3676; G01C 21/3682; G06T 1/60; G06T 17/05; G06T 19/00; G06T 19/003; G06T 13/20; G06T 2207/20212; G09B 29/10; G09B 29/007; G09B 29/00; G09B 29/003; G09B 29/005; Y02T 10/7291; Y02T 90/16; Y02T 90/161; Y02T 90/162; G08G 1/0969; G08G 5/0034; B60L 2240/622; B64C 2201/123; B64C 2201/127; B64C 2201/141

See application file for complete search history.

(56) References Cited

U.S. PATENT DOCUMENTS

| | | | |
|---|---|---|---|
| 2017/0371897 A1* | 12/2017 | Strong | G06Q 50/16 |
| 2018/0253424 A1* | 9/2018 | Banerjee | G06K 9/4642 |
| 2018/0253621 A1* | 9/2018 | Banerjee | G06T 1/0007 |
| 2019/0130182 A1* | 5/2019 | Zang | G06K 9/00651 |
| 2019/0204088 A1* | 7/2019 | Haque | G01C 21/30 |
| 2019/0236097 A1* | 8/2019 | Fentzke | G06F 16/5838 |

* cited by examiner

AREA OF INTEREST BOUNDARY EXTRACTING METHOD AND APPARATUS, DEVICE AND COMPUTER STORAGE MEDIUM

The present application claims the priority of Chinese Patent Application No. 201710138011.X, filed on Mar. 9, 2017, with the title of "Area of interest boundary extracting method and apparatus, device and computer storage medium", the entire disclosure of which is hereby incorporated by reference in its entirety.

FIELD OF THE DISCLOSURE

The present disclosure relates to the technical field of map service, and particularly to an area of interest boundary extracting method and apparatus, a device and a computer storage medium.

BACKGROUND OF THE DISCLOSURE

In map application, determination of Arear of Interest (AOI) boundary is of great significance for compilation of a map, a user's experience in querying a map and statistics of the user's access to the AOI. At present, a map compiling authority mainly determines the AOI boundary in a manual surveying and mapping manner. However, this manner has the following drawbacks: (1) costs are very high; with regards to manpower, many professionals having expertise in map information are needed to consume time and make efforts to mark; with regards to capital, a lot of funds needs to be spent to mark samples; (2) an automatic detection algorithm is not provided; once AOI changes, update situations of the boundary need to be manually checked again, thereby causing a new round of consumption of costs; (3) it is very difficult and less-accurate to manually collect and mark AOIs in city suburbs or remote villages which are relatively sparsely-populated.

SUMMARY OF THE DISCLOSURE

In view of the above, the present disclosure provides an area of interest boundary extracting method and apparatus, a device and a computer storage medium, which can automatically and accurately implement extraction of the area of interest and thereby reduce the boundary extracting costs.

A technical problem employed by the present disclosure to solve the technical problem provides an area of interest boundary extracting method, the method comprising: obtaining a satellite image and a road network base map including an area of interest; merging the obtained satellite image and road network base map to obtain merged data; using a binarizing model to perform binarization for the merged data to obtain a binarized image, wherein the binarizing model is obtained by training according to training data in advance; extracting a boundary of the binarized image as the boundary of the area of interest.

According to a preferred embodiment of the present disclosure, the binarizing model is obtained in advance in the following manner: obtaining the area of interest from a map database; obtaining the satellite image and the road network base map including the area of interest; merging the obtained satellite image and road network base map to obtain merged data; considering the merged data as training date, setting a tag value of a pixel located in the area of interest in the training data as 1, and setting a tag value of a pixel outside the area of interest in the training data as 0; using the training data to train a classification model to obtain the binarizing model.

According to a preferred embodiment of the present disclosure, the obtaining the satellite image and the road network base map including the area of interest comprises: obtaining the satellite image including the area of interest; obtaining the road network base map in an actual geographical scope corresponding to the satellite image in road network data.

According to a preferred embodiment of the present disclosure, obtaining the satellite image including the area of interest comprises: obtaining a location in the area of interest; obtaining a satellite image in a preset geographical scope with the location as a center.

According to a preferred embodiment of the present disclosure, the merging the obtained satellite image and road network base map to obtain merged data comprises: performing weight combination for a satellite image grayscale map and the road network base map to obtain weight-combined channel data; merging RGB channel data of the satellite image with the weight-combined channel data to obtain merged data.

According to a preferred embodiment of the present disclosure, the using the binarizing model to perform binarization for the merged data to obtain the binarized image comprises: inputting the merged data in the binarizing model to obtain tag values of pixels in the merged data; obtaining the binarized image according to the tag values of pixels in the merged data.

According to a preferred embodiment of the present disclosure, the extracting a boundary of the binarized image as the boundary of the area of interest comprises: using a gradient operator to perform edge detection for the binarized image to obtain the boundary of the binarized image; or performing polygonal fitting for the binarized image and using a polygon obtained from fitting to determine the boundary of the binarized image.

According to a preferred embodiment of the present disclosure, the classification model comprises a deep full convolution network.

A technical problem employed by the present disclosure to solve the technical problem provides an area of interest boundary extracting apparatus, the apparatus comprising: an obtaining unit configured to obtain a satellite image and a road network base map including an area of interest; a merging unit configured to merge the obtained satellite image and road network base map to obtain merged data; a processing unit configured to use a binarizing model to perform binarization for the merged data to obtain a binarized image, wherein the binarizing model is obtained by training according to training data in advance; an extracting unit configured to extract a boundary of the binarized image as the boundary of the area of interest.

According to a preferred embodiment of the present disclosure, the apparatus further comprises a training unit configured to train in advance in the following manner to obtain the binarizing model: obtaining the area of interest from a map database; obtaining the satellite image and the road network base map including the area of interest; merging the obtained satellite image and road network base map to obtain merged data; considering the merged data as training date, setting a tag value of a pixel located in the area of interest in the training data as 1, and setting a tag value of a pixel outside the area of interest as 0; using the training data to train a classification model to obtain the binarizing model.

According to a preferred embodiment of the present disclosure, upon obtaining the satellite image and the road network base map including the area of interest, the apparatus specifically performs: obtaining the satellite image including the area of interest; obtaining the road network base map in an actual geographical scope corresponding to the satellite image in road network data.

According to a preferred embodiment of the present disclosure, upon obtaining the satellite image including the area of interest, the apparatus specifically performs: obtaining a location in the area of interest; obtaining a satellite image in a preset geographical scope with the location as a center.

According to a preferred embodiment of the present disclosure, upon merging the obtained satellite image and road network base map to obtain merged data, the apparatus specifically performs: performing weight combination for a satellite image grayscale map and the road network base map to obtain weight-combined channel data; merging RGB channel data of the satellite image with the weight-combined channel data to obtain merged data.

According to a preferred embodiment of the present disclosure, upon using the binarizing model to perform binarization for the merged data to obtain the binarized image, the processing unit specifically performs: inputting the merged data in the binarizing model to obtain tag values of pixels in the merged data; obtaining the binarized image according to the tag values of pixels in the merged data.

According to a preferred embodiment of the present disclosure, upon extracting a boundary of the binarized image as the boundary of the area of interest, the extracting unit performs: using a gradient operator to perform edge detection for the binarized image to obtain the boundary of the binarized image; or performing polygonal fitting for the binarized image and using a polygon obtained from fitting to determine the boundary of the binarized image.

According to a preferred embodiment of the present disclosure, the classification model used by the training unit comprises a deep full convolution network.

As can be seen from the above technical solutions, the boundary extracting costs are reduced and automatic and accurate extraction of the boundary of the area of interest is implemented by obtaining the satellite image and the road network base map including the area of interest, and inputting the data formed by merging the satellite image with the road network base map into the binarizing model.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Since satellite image and road network data are closely related to an AOI, it is feasible to use satellite image or road network data to implement detection of the AOI. It is found through research that road network data can remedy the drawback of undesirable quality of partial satellite image, and road network data may enhance weight of AOI boundary gradient information in the satellite image so that more concerns are placed on areas with distinct gradient features upon boundary detection, thereby reducing detection challenges caused by diversity of different AOI satellite image; on the other hand, satellite image are not limited to geographical locations, can provide rich visual information, and prove an ideal supplementation for incompleteness of road network data. Therefore, the present disclosure provides a method and apparatus of extracting an area of interest boundary based on satellite image and road network data, a device and a computer storage medium, so that the satellite image and road network data supplement one another, and drawbacks upon individually using satellite image or road network data to extract AOI boundary are overcome, thereby reducing surveying and mapping costs and implementing automatic and accurate extraction of the AOI boundary.

Figure 1:
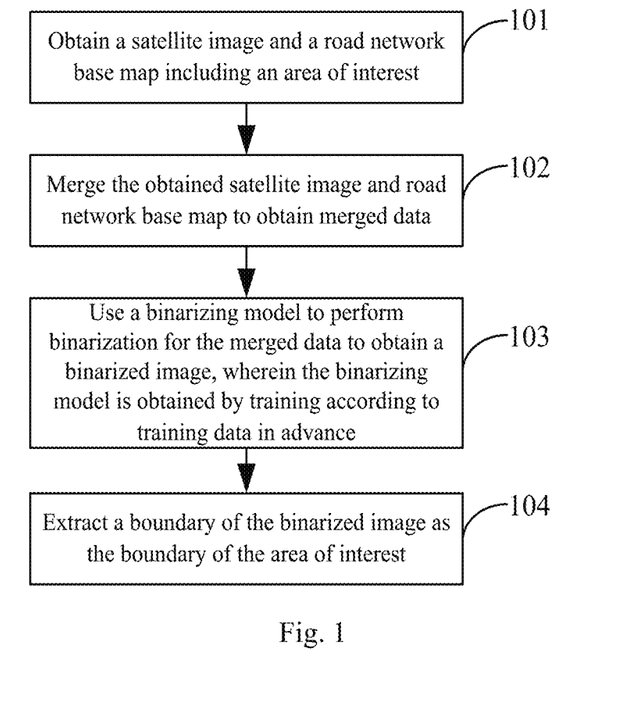
FIG. 1 is a flow chart of a method according to an embodiment of the present disclosure.

FIG. 1 is a flow chart of a method according to an embodiment of the present disclosure. As shown in FIG. 1, the method may mainly comprise the following steps:

In 101 are obtained a satellite image and a road network base map including an area of interest.

In this step, the area of interest included by the obtained satellite image and the road network base map is the area of interest whose boundary is to be extracted.

Optionally, in a specific implementation procedure of the present embodiment, it is feasible to obtain a satellite image including the area of interest according to a location in the area of interest, or capture a whole satellite image to obtain the satellite image including the area of interest.

Wherein, when the satellite image including the area of interest is obtained according to the location in the area of interest, a satellite image in a preset geographical scope with the location as a center is obtained as the satellite image including the area of interest. In the present embodiment, 17-level map tiles are joined to form the satellite image, and each pixel in the 17-level map tile actually maps a geographic scope of 2*2 square meters. Therefore, the present geographic scope in the present embodiment is 512*512 square meters. It is discovered from experiments that the geographic scope of 512*512 square meters may cover most of the area of interest. If particularly necessary, map tiles of different levels may be employed to change the geographic scope of the obtained satellite image. This is not limited in the present disclosure. It is feasible to ensure the obtained satellite image includes the area of interest.

In this step, after the satellite image including the area of interest is obtained, an actual geographic scope where the satellite image lies is determined according to an actual geographic scope of the satellite image, for example, by reading position coordinates of each corner point in the satellite image, and then a vector base map of road network information corresponding to the actual geographic scope where the satellite image lies is obtained from the road network data. For purpose of easy description, the road network base map is used to represent the vector base map of the road network information. In the obtained road network base map, if coordinates of a pixel in the road network base map corresponds to a road at an actual geographic location, a value of the pixel is 1, otherwise it is 0.

Figure 2:
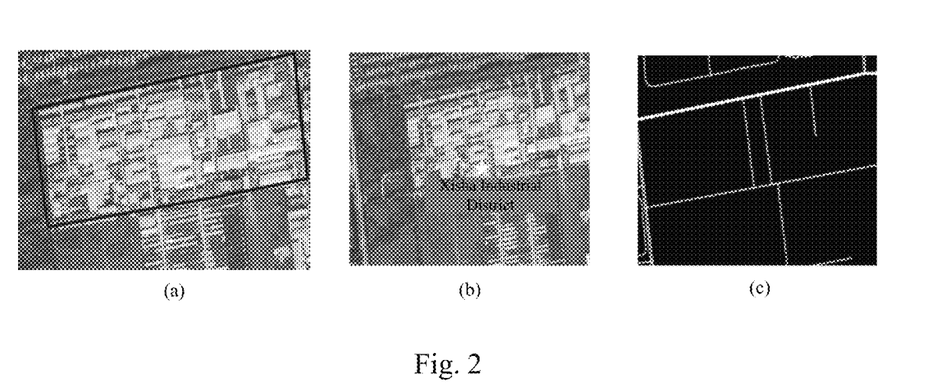
FIG. 2 is schematic diagrams of satellite images and a road network base map according to an embodiment of the present disclosure.

As shown in FIG. 2, illustration is provided by taking obtaining the satellite image including the area of interest and obtaining the road network base map according to a location in the area of interest as an example. The area of interest is area "Xisha IndustrialDistrict" in a box in (a) of FIG. 2, the location in the area of interest is denoted with "☆", the satellite image with the geographic scope 512*512 with the location as a center is obtained as (b) in FIG. 2, and then the vector base map corresponding to the road network information of the satellite image is obtained as (c) in FIG. 2 according to the actual geographic scope of the satellite image. In (c) of FIG. 2, the value of the pixel actually at the location of the road is 1, and values of pixels at other locations are 0.

In 102, the obtained satellite image and road network base map are merged to obtain merged data.

It is found from research that the AOI boundary has relatively distinct gradient information on the satellite image, or texture in the same AOI is relatively uniform, so it is feasible to use the satellite image to assist automatic recognition of the AOI boundary. In addition, it is found from analysis of the AOI boundary in the satellite image that most of the AOI boundary is highly coincident with its nearby road network, so the road network data is of great value for the determination of the AOI boundary.

However, using the satellite image or road network data individually to determine the AOI boundary has the following limitations: (1) recognition of the satellite image is limited to image quality, and cloud and smog affects quality of the satellite image to a large degree. In addition, image features presented in different AOIs might vary substantially, so a huge challenge is proposed for a boundary detection algorithm. (2) since road network data are mostly obtained through manual collection or manual surveying and mapping, road network data are incomplete. Particularly for remote regions, it usually occurs that the road network is incomplete, messy or the like. Therefore, it is also difficult to obtain a complete and closed AOI boundary with the road network data only.

Therefore, in the present step, merging the obtained satellite image with the road network base map to overcome the drawback caused by using the satellite image or road network data individually makes the extracted AOI boundary more accurate. Merging the satellite image and the road network base map to obtain merged data comprises: performing weight combination for a satellite image grayscale map and the road network base map to obtain weight-combined channel data; merging RGB channel data of the satellite image with the weight-combined channel data to obtain merged data.

For ease of description, the obtained satellite image is represented as I(x,y), the road network base map corresponding thereto is represented as M(x,y), the weight-combined data of the satellite image grayscale map and the road network base map is represented as $IM_{c4}(x,y)$, the satellite image grayscale map is represented as $G_I(x,y)$, the merged data formed by merging RGB channel data of the satellite image with the weight-combined channel data is represented as IM(x,y), and (x,y) represents coordinates of a location obtained in the area of interest.

Wherein, a formula for calculating the weight-combined data of the satellite image grayscale map and the road network base map is as follows:

$$IM_{c4}(x,y) = G_I(x,y) \odot (1 + \alpha M(x,y))$$

In the formula, $G_I(x,y)$ is the grayscale image of the satellite image I(x,y), α is a weight control parameter, ⊙ is Hadamard multiply, and 1 is a all-1 matrix.

Since the value of the pixel at the location of the road in the road network base map is 1, and values of pixels at other locations are 0, the fourth channel $IM_{c4}(x,y)$ obtained by the above formula enhances the weight of the road network information in the satellite image, overcomes the drawback of using the satellite image or road network base map individually, and can enable the satellite image with the road network information as the boundary of the area of interest to have a higher accuracy.

Figure 3:
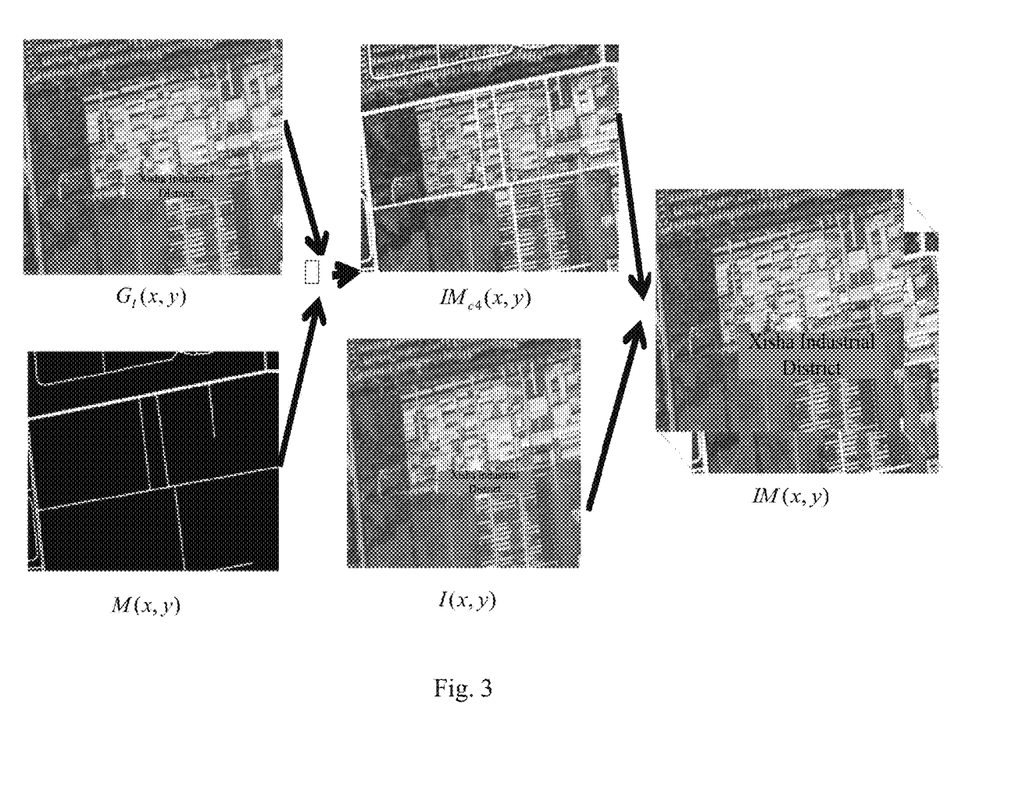
FIG. 3 is schematic diagrams showing merge of satellite image with the road network base map according to an embodiment of the present disclosure.

The merged data formed by merging RGB channel data of the satellite image with the weight-combined channel data is represented by IM(x,y) in FIG. 3. Since the merged data is already not in the form of a picture and cannot be represented with a picture any longer, IM(x,y) in FIG. 3 is employed to superimpose the RGB channel data of the satellite image with the weight-combined channel data to indicate that the merged data is formed by merging the RGB channel data of the satellite image with the weight-combined channel data of the satellite image grayscale map and the road network base map.

Optionally, in a specific implementation procedure of the present embodiment, it is feasible to use the weight-combined channel data of the satellite image grayscale map and the road network base map as the merged data, and use the data formed by merging RGB channel data of the satellite image with the weight-combined channel data as the merged data. The boundary extracting effect achieved by using the data formed by merging RGB channel data of the satellite image with the weight-combined channel data is better than the boundary extracting effect achieved by using the weight-combined channel data of the satellite image grayscale map and the road network base map as the merged data. Therefore, it is preferable to use the data formed by merging RGB channel data of the satellite image with the weight-combined channel data as the merged data in the present embodiment.

For example, as shown in FIG. 3, the data formed by merging RGB channel data of the satellite image with the weight-combined channel data is used as the merged data. The area of interest is area "Xisha IndustrialDistrict", an obtained location in the area of interest is denoted with "☆" in the figure and its coordinates are (x,y). In FIG. 3, $G_I(x,y)$ is a grayscale image of the satellite image $I(x,y)$, $M(x,y)$ is the road network base map, $IM_{c4}(x,y)$ is the weight-combined data of the satellite image grayscale map and the road network base map, $I(x,y)$ is the satellite image, and $IM(x,y)$ is the data formed by merging RGB channel data of the satellite image with the weight-combined channel data.

In 103, use a binarizing model to perform binarization for the merged data to obtain a binarized image, wherein the binarizing model is obtained by training according to training data in advance.

In the present step, the used binarizing model is pre-obtained by training according to training data. The binarizing model belongs to a classification model. A network structure of the classification model may be a deep full convolution network, or may be Deeplab, Deeplab-v2 or a self-built full convolution network based on end-to-end convolution and deconvolution. The deep full convolution network is used in the present embodiment. The present disclosure does not limit the network structure used by the classification model.

A specific procedure of training the classification model to obtain the binarizing model is as follows: obtain the area of interest from a map database, obtain, by crawling network data, the satellite image including the area of interest and the road network base map in an actual geographical scope corresponding to the satellite image in road network data, and consider the data formed by merging the obtained satellite image and the road network base map as training data. Since an effect of the binarized image obtained by using the data formed by merging RGB channel data of the satellite image with the weight-combined channel data is better, it is preferable to select the data formed by merging RGB channel data of the satellite image with the weight-combined channel data as the training data in the present embodiment.

According to the obtained training data, a tag value of a pixel located in the area of interest in the training data is set as 1, and a tag value of a pixel outside the area of interest in the training data is set 0. Then, the training data is used to train the classification model to obtain the binarizing model so that an output result of the binarizing model is a binarized image consistent with the original satellite image in size. In the binarized image, pixels with value 1 are located in the area of interest, and pixels with the value 0 are located outside the area of interest.

In the present step, after the binarizing model is obtained, the data formed by merging the satellite image and road network base map obtained from a location in the area of interest is input in the binarizing model, and the binarized image consistent with the obtained satellite image in size is output. In the output binarized image, an area with a pixel value 1 represents the area of interest, and an area with the pixel value 0 is an area outside the area of interest.

Figure 4:
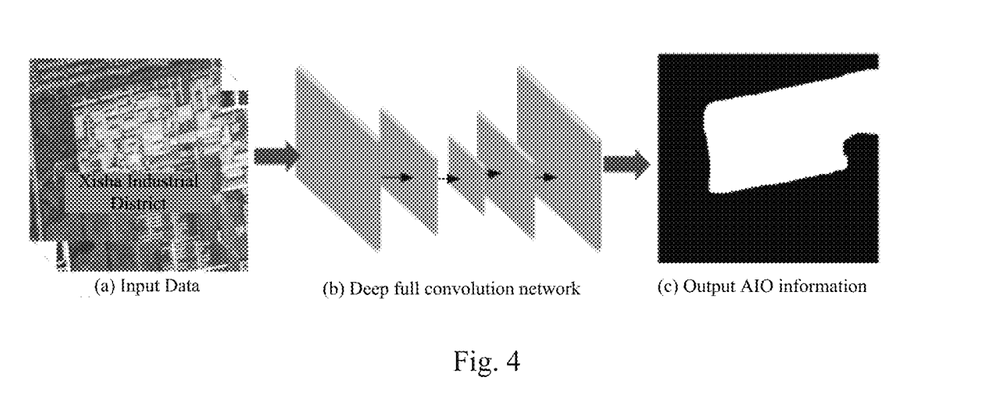
FIG. 4 is schematic diagrams of processing merged data according to an embodiment of the present disclosure.

For example, as shown in FIG. 4, the used merged data is data formed by merging the RGB channel data of the satellite image and the weight-combined channel data, and the network structure used by the binarizing model is a deep full convolution network. After the merged data is input into the binarizing model, the output result of the binarizing model is a binarized image consistent with the obtained satellite image in size. In the output binarized image, an area with a pixel value 1 represents a target area of interest, and an area with the pixel value 0 is an area outside the area of interest.

In 104, a boundary of the binarized image is extracted as the boundary of the area of interest.

In the present step, an edge detection algorithm is used to extract the boundary of the binarized image according to the binarized image output by the binarizing model, and the extracted boundary of the binarized image is considered as the boundary of the area of interest.

Optionally, in a specific implementation procedure of the present embodiment, it is feasible to extract the boundary of the binarized image by using an edge detection algorithm based on Ganny operator, Sobel operator, Laplace operator or the like, or extract the boundary of the binarized image by using an edge detection algorithm based on polygonal fitting. Using the edge detection algorithm to extract the boundary of the binarized image belongs to the prior art and is not detailed herein.

Figure 5:
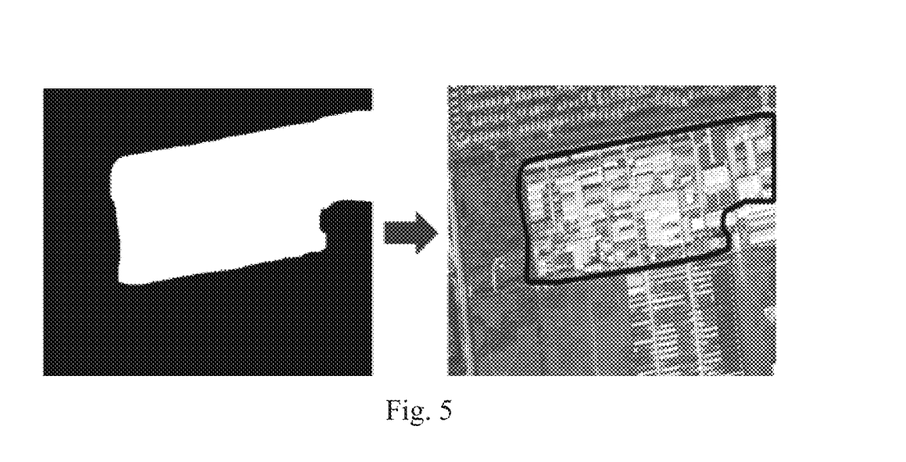
FIG. 5 is a schematic diagram of extracting a boundary according to an embodiment of the present disclosure.

For example, as shown in FIG. 5, the edge detection algorithm based on Canny operator is used to extract the boundary. The left figure is the binarized image output by the binarizing model, and the right figure is the boundary of the area of interest extracted by using the edge detection algorithm based on Canny operator according to the binarized image. The extracted boundary of the area of interest is marked by a block solid line in the figure.

Figure 6:
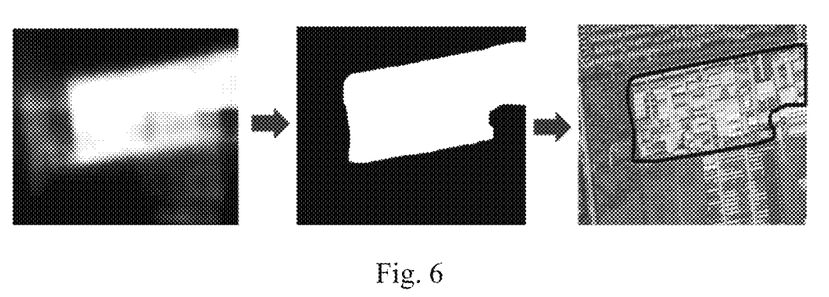
FIG. 6 is a schematic diagram of extracting a boundary according to another embodiment of the present disclosure.

Since the output result of the binarizing model might be abnormal, in the step it is further feasible to extract the boundary of the binarized image by using the edge detection algorithm based on the polygonal fitting. For example, as shown in FIG. 6, morphology processing is performed for the output result of the binarizing model to obtain a binarized communication area; the obtained binarized communication area is screened to delete erroneous or abnormal communication area; then the edge of the remaining communication area is fitted by using polygonal fitting, the obtained polygon is the boundary of the binarized image, and the boundary of the obtained binarized image is determined as the boundary of the area of interest.

Figure 7:
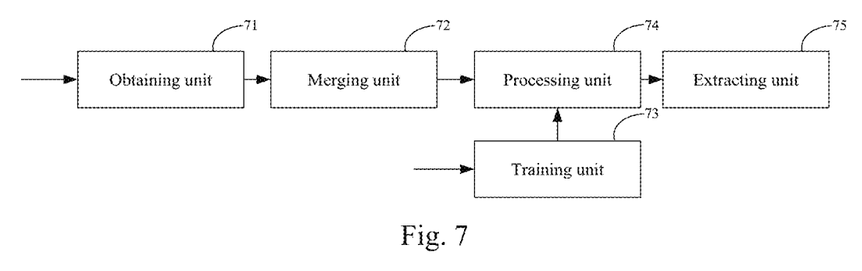
FIG. 7 is a block diagram of an apparatus according to an embodiment of the present disclosure.

A block diagram of an apparatus according to an embodiment of the present disclosure is described below in detail. As shown in FIG. 7, the apparatus comprises: an obtaining unit 71, a merging unit 72, a training unit 73, a processing unit 74 and an extracting unit 75.

The obtaining unit 71 is configured to obtain a satellite image and a road network base map including an area of interest.

The area of interest included by the satellite image and the road network base map obtained by the obtaining unit 71 is the area of interest whose boundary is to be extracted.

Optionally, in a specific implementation procedure of the present embodiment, the obtaining unit 71 is configured to obtain a satellite image including the area of interest according to a location in the area of interest, and the obtaining unit 71 is further configured to capture a whole satellite image to obtain the satellite image including the area of interest.

Upon obtaining the satellite image including the area of interest according to the location in the area of interest, the obtaining unit 71 obtains a satellite image in a preset geographical scope with the location as a center as the satellite image including the area of interest. In the present embodiment, 17-level map tiles are joined to form the satellite image, and each pixel in the 17-level map tile actually maps a geographic scope of 2*2 square meters. Therefore, the present geographic scope in the present embodiment is 512*512 square meters. It is found from experiments that the geographic scope of 512*512 square meters may cover most of the area of interest. If particularly necessary, map tiles of different levels may be employed to change the geographic scope of the obtained satellite image. This is not limited in the present disclosure. It is feasible to ensure the satellite image obtained by the obtaining unit 71 includes the area of interest.

After the satellite image including the area of interest, the obtaining unit 71 determines an actual geographic scope where the satellite image lies according to an actual geographic scope of the satellite image, for example, by reading position coordinates of each corner point in the satellite image, and then obtains a vector base map of road network information corresponding to the actual geographic scope where the satellite image lies from the road network data. For purpose of easy description, the road network base map is used to represent the vector base map of the road network information. In the obtained road network base map, if coordinates of a pixel in the road network base map corresponds to a road at an actual geographic location, a value of the pixel is 1, otherwise it is 0.

The merging unit 72 is configured to merge the obtained satellite image and road network base map to obtain merged data.

It is found from research that the AOI boundary has relatively distinct gradient information on the satellite image, or texture in the same AOI is relatively uniform, so it is feasible to use the satellite image to assist automatic recognition of the AOI boundary. In addition, it is found from analysis of the AOI boundary in the satellite image that most of the AOI boundary is highly coincident with its nearby road network, so the road network data is of great value for the determination of the AOI boundary.

However, using the satellite image or road network data individually to determine the AOI boundary has the following limitations: (1) recognition of the satellite image is limited to image quality, and cloud and smog affects quality of the satellite image to a large degree. In addition, image features presented in different AOIs might vary substantially, so a huge challenge is proposed for a boundary detection algorithm. (2) Since road network data are mostly obtained through manual collection or manual surveying and mapping, road network data are incomplete. Particularly for remote regions, it usually occurs that the road network is incomplete, messy or the like. Therefore, it is also difficult to obtain a complete and closed AOI boundary with the road network data only.

Therefore, the merging unit 72 merges the obtained satellite image with the road network base map to overcome the drawback caused by using the satellite image or road network data individually to make the extracted AOI boundary more accurate. Upon merging the satellite image and the road network base map to obtain merged data, the merging unit 72 specifically performs: performing weight combination for a satellite image grayscale map and the road network base map to obtain weight-combined channel data; merging RGB channel data of the satellite image with the weight-combined channel data to obtain merged data.

For ease of description, the obtained satellite image is represented as I(x,y), the road network base map corresponding thereto is represented as M(x,y) the weight-combined data of the satellite image grayscale map and the road network base map is represented as $IM_{c4}(x,y)$, the satellite image grayscale map is represented as $G_f(x,y)$ the merged data formed by merging RGB channel data of the satellite image with the weight-combined channel data is represented as IM(x,y), and (x,y) represents coordinates of a location obtained in the area of interest.

Wherein, a formula for calculating the weight-combined data of the satellite image grayscale map and the road network base map is as follows:

$$IM_{c4}(x,y)=G_f(x,y) \square (1+\alpha M(x,y))$$

In the formula, $G_f(x,y)$ is the grayscale image of the satellite image I(x,y), α is a weight control parameter, $\square$ is Hadamard multiply, and 1 is a all-1 matrix.

Since the value of the pixel at the location of the road in the road network base map is 1, and values of pixels at other locations are 0, the fourth channel $IM_{c4}(x,y)$ obtained by the merging unit 72 through the above formula enhances the weight of the road network information in the satellite image, overcomes the drawback of using the satellite image or road network base map individually, and can enable the satellite image with the road network information as the boundary of the area of interest to have a higher accuracy.

The merged data formed by the merging unit 72 by merging RGB channel data of the satellite image with the weight-combined channel data is represented by IM(x,y) in FIG. 3. Since the merged data is already not in the form of a picture and cannot be represented with a picture any longer, IM(x,y) in FIG. 3 is employed to superimpose the RGB channel data of the satellite image with the weight-combined channel data to indicate that the merged data is formed by merging the RGB channel data of the satellite image with the weight-combined channel data of the satellite image grayscale map and the road network base map.

Optionally, in a specific implementation procedure of the present embodiment, the merging unit 72 may use the weight-combined channel data of the satellite image grayscale map and the road network base map as the merged data, and use the data formed by merging RGB channel data of the satellite image with the weight-combined channel data as the merged data. The boundary extracting effect achieved by using the data formed by merging RGB channel data of the satellite image with the weight-combined channel data is better than the boundary extracting effect achieved by using the weight-combined channel data of the satellite image grayscale map and the road network base map as the merged data. Therefore, it is preferable to use the data formed by merging RGB channel data of the satellite image with the weight-combined channel data as the merged data in the present embodiment.

The training unit 73 is configured to train according to training data in an advance to obtain a binarizing model.

The binarizing model obtained by the training unit 73 according to training data belongs to a classification model. A network structure of the classification model may be a deep full convolution network, or may be Deeplab, Deeplab-v2 or a self-built full convolution network based on end-to-end convolution and deconvolution. The deep full convolution network is used in the present embodiment. The present disclosure does not limit the network structure used by the classification model.

Upon training the classification model to obtain the binarizing model, the training unit 73 specifically performs: obtain the area of interest from a map database, obtain, by crawling network data, the satellite image including the area of interest and the road network base map in an actual geographical scope corresponding to the satellite image in road network data, and consider the data formed by merging the obtained satellite image and the road network base map as training data. Since an effect of the binarized image obtained by using the data formed by merging RGB channel data of the satellite image with the weight-combined channel data is better, it is preferable to select the data formed by merging RGB channel data of the satellite image with the weight-combined channel data as the training data in the present embodiment. The merged data serve as the training data. A procedure of merging the satellite image with the road network base map is consistent with what is described in 102 and not detailed herein any more.

According to the obtained training data, the training unit 73 sets a tag value of a pixel located in the area of interest in the training data as 1, and sets a tag value of a pixel outside the area of interest in the training data as 0. Then, the training unit 73 uses the training data to train the classification model to obtain the binarizing model so that an output result of the binarizing model is a binarized image consistent with the original satellite image in size. In the binarized image, pixels with a value 1 are located in the area of interest, and pixels with the value 0 are located outside the area of interest.

The processing unit 74 is configured to use the binarizing model to perform binarization for the merged data to obtain the binarized image, wherein the binarizing model is obtained by training according to training data in advance.

The processing unit 74 uses the binarizing model obtained by the training unit 73 to process the merged data obtained by the merging unit 72 to obtain the binarized image consistent with the obtained satellite image in size. In the output binarized image, an area with a pixel value 1 is the area of interest, and an area with the pixel value 0 is an area outside the area of interest.

The extracting unit 75 is configured to extract a boundary of the binarized image as the boundary of the area of interest.

The extracting unit 75 is configured to use an edge detection algorithm to extract the boundary of the binarized image according to the binarized image output by the binarizing model, and consider the extracted boundary of the binarized image as the boundary of the area of interest.

Optionally, in a specific implementation procedure of the present embodiment, the extracting unit 75 may extract the boundary of the binarized image by using an edge detection algorithm based on Ganny operator, Sobel operator, Laplace operator or the like. The extracting unit 75 may also extract the boundary of the binarized image by using an edge detection algorithm based on polygonal fitting. Using the edge detection algorithm to extract the boundary of the binarized image belongs to the prior art and is not detailed herein.

Figure 8:
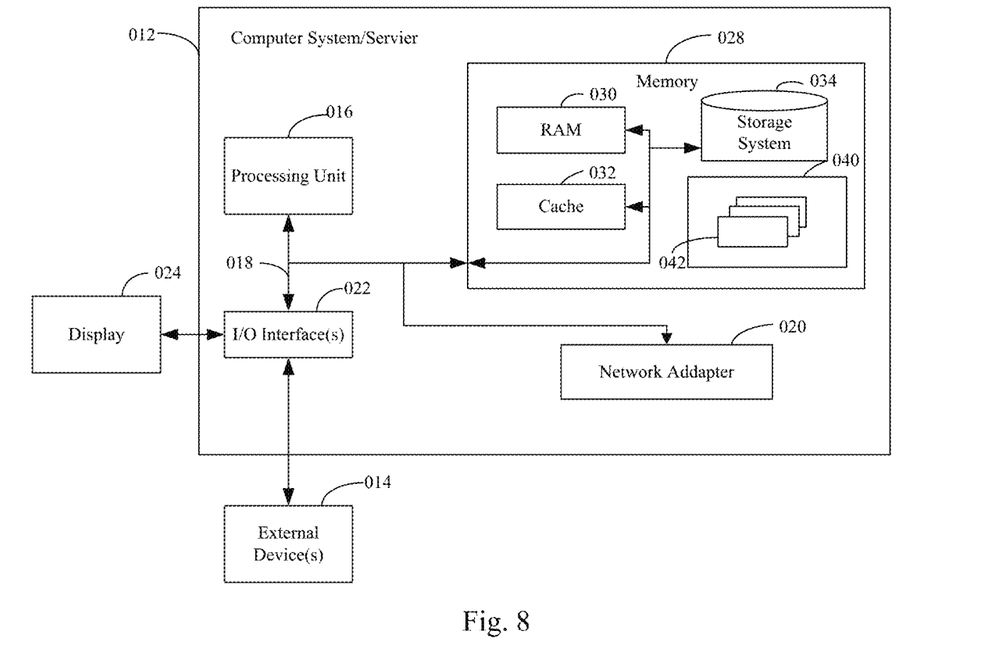
FIG. 8 is a block diagram of a computer system/server according to an embodiment of the present disclosure.

FIG. 8 illustrates a block diagram of an example computer system/server 012 adapted to implement an implementation mode of the present disclosure. The computer system/server 012 shown in FIG. 8 is only an example and should not bring about any limitation to the function and scope of use of the embodiments of the present disclosure.

As shown in FIG. 8, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 8 and typically called a "hard drive"). Although not shown in FIG. 8, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 8, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the method of extracting the boundary of the area of interest, comprising:

obtaining a satellite image and a road network base map including an area of interest;

merging the obtained satellite image and road network base map to obtain merged data;

using a binarizing model to perform binarization for the merged data to obtain a binarized image, wherein the binarizing model is obtained by training according to training data in advance;

extracting a boundary of the binarized image as the boundary of the area of interest.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method performed by the one or more processors may comprise:

obtaining a satellite image and a road network base map including an area of interest;

merging the obtained satellite image and road network base map to obtain merged data;

using a binarizing model to perform binarization for the merged data to obtain a binarized image, wherein the binarizing model is obtained by training according to training data in advance;

extracting a boundary of the binarized image as the boundary of the area of interest.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, the boundary extracting costs are reduced and automatic and accurate extraction of the boundary of the area of interest is implemented by obtaining the satellite image and the road network base map including an area of interest, and inputting the data formed by merging the satellite image with the road network base map into the binarizing model.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An area of interest boundary extracting method, wherein the method comprises:
   obtaining a satellite image and a road network base map including an area of interest;
   merging the obtained satellite image and road network base map to obtain merged data;

using a binarizing model to perform binarization for the merged data to obtain a binarized image, wherein the binarizing model is obtained by training according to training data in advance;

extracting a boundary of the binarized image as the boundary of the area of interest.

2. The method according to claim 1, wherein the binarizing model is obtained in advance in the following manner:
obtaining an area of interest from a map database;
obtaining a satellite image and a road network base map including the area of interest;
merging the obtained satellite image and road network base map to obtain merged data;
considering the merged data as training data, setting a tag value of a pixel located in the area of interest in the training data as 1, and setting a tag value of a pixel outside the area of interest in the training data as 0;
using the training data to train a classification model to obtain the binarizing model.

3. The method according to claim 1, wherein the obtaining a satellite image and a road network base map including an area of interest comprises:
obtaining a satellite image including the area of interest;
obtaining a road network base map in an actual geographical scope corresponding to the satellite image in road network data; or
obtaining a location in the area of interest; obtaining a satellite image in a preset geographical scope with the location as a center.

4. The method according to claim 1, wherein the merging the obtained satellite image and road network base map to obtain merged data comprises:
performing weight combination for the satellite image grayscale map and the road network base map to obtain weight-combined channel data;
merging RGB channel data of the satellite image with the weight-combined channel data to obtain merged data.

5. The method according to claim 1, wherein the using the binarizing model to perform binarization for the merged data to obtain the binarized image comprises:
inputting the merged data to the binarizing model to obtain tag values of each pixels in the merged data;
obtaining the binarized image according to the tag values of each pixels in the merged data.

6. The method according to claim 1, wherein the extracting a boundary of the binarized image as the boundary of the area of interest comprises:
using a gradient operator to perform edge detection for the binarized image to obtain the boundary of the binarized image; or
performing polygonal fitting for the binarized image and using a polygon obtained from fitting to determine the boundary of the binarized image.

7. The method according to claim 2, wherein the classification model comprises a deep full convolution network.

8. A device, wherein the apparatus comprises:
one or more processors;
a memory for storing one or more programs,
said one or more programs are executed by said one or more processors to enable said one or more processors to implement the following operation:
obtaining a satellite image and a road network base map including an area of interest;
merging the obtained satellite image and road network base map to obtain merged data;
using a binarizing model to perform binarization for the merged data to obtain a binarized image, wherein the binarizing model is obtained by training according to training data in advance;
extracting a boundary of the binarized image as the boundary of the area of interest.

9. A non-transitory machine-readable storage medium comprising computer-executable instructions, the computer-executable instructions being used to implement the following operation when the computer-executable instructions are executed by a computer processor:
obtaining a satellite image and a road network base map including an area of interest;
merging the obtained satellite image and road network base map to obtain merged data;
using a binarizing model to perform binarization for the merged data to obtain a binarized image, wherein the binarizing model is obtained by training according to training data in advance;
extracting a boundary of the binarized image as the boundary of the area of interest.

10. The device according to claim 8, wherein the binarizing model is obtained in advance in the following manner:
obtaining an area of interest from a map database;
obtaining a satellite image and a road network base map including the area of interest;
merging the obtained satellite image and road network base map to obtain merged data;
considering the merged data as training data, setting a tag value of a pixel located in the area of interest in the training data as 1, and setting a tag value of a pixel outside the area of interest in the training data as 0;
using the training data to train a classification model to obtain the binarizing model.

11. The device according to claim 8, wherein the obtaining a satellite image and a road network base map including an area of interest comprises:
obtaining a satellite image including the area of interest;
obtaining a road network base map in an actual geographical scope corresponding to the satellite image in road network data; or
obtaining a location in the area of interest; obtaining a satellite image in a preset geographical scope with the location as a center.

12. The device according to claim 8, wherein the merging the obtained satellite image and road network base map to obtain merged data comprises:
performing weight combination for the satellite image grayscale map and the road network base map to obtain weight-combined channel data;
merging RGB channel data of the satellite image with the weight-combined channel data to obtain merged data.

13. The device according to claim 8, wherein the using the binarizing model to perform binarization for the merged data to obtain the binarized image comprises:
inputting the merged data to the binarizing model to obtain tag values of each pixels in the merged data;
obtaining the binarized image according to the tag values of each pixels in the merged data.

14. The device according to claim 8, wherein the extracting a boundary of the binarized image as the boundary of the area of interest comprises:
using a gradient operator to perform edge detection for the binarized image to obtain the boundary of the binarized image; or performing polygonal fitting for the binarized image and using a polygon obtained from fitting to determine the boundary of the binarized image.

15. The device according to claim 10, wherein the classification model comprises a deep full convolution network.

16. The non-transitory machine-readable storage medium according to claim 9, wherein the binarizing model is obtained in advance in the following manner:
   obtaining an area of interest from a map database;
   obtaining a satellite image and a road network base map including the area of interest;
   merging the obtained satellite image and road network base map to obtain merged data;
   considering the merged data as training data, setting a tag value of a pixel located in the area of interest in the training data as 1, and setting a tag value of a pixel outside the area of interest in the training data as 0;
   using the training data to train a classification model to obtain the binarizing model.

17. The non-transitory machine-readable storage medium according to claim 9, wherein the obtaining a satellite image and a road network base map including an area of interest comprises:
   obtaining a satellite image including the area of interest;
   obtaining a road network base map in an actual geographical scope corresponding to the satellite image in road network data; or
   obtaining a location in the area of interest; obtaining a satellite image in a preset geographical scope with the location as a center.

18. The non-transitory machine-readable storage medium according to claim 9, wherein the merging the obtained satellite image and road network base map to obtain merged data comprises:
   performing weight combination for the satellite image grayscale map and the road network base map to obtain weight-combined channel data;
   merging RGB channel data of the satellite image with the weight-combined channel data to obtain merged data.

19. The non-transitory machine-readable storage medium according to claim 9, wherein the using the binarizing model to perform binarization for the merged data to obtain the binarized image comprises:
   inputting the merged data to the binarizing model to obtain tag values of each pixels in the merged data;
   obtaining the binarized image according to the tag values of each pixels in the merged data.

20. The non-transitory machine-readable storage medium according to claim 9, wherein the extracting a boundary of the binarized image as the boundary of the area of interest comprises:
   using a gradient operator to perform edge detection for the binarized image to obtain the boundary of the binarized image; or
   performing polygonal fitting for the binarized image and using a polygon obtained from fitting to determine the boundary of the binarized image.

21. The non-transitory machine-readable storage medium according to claim 16, wherein the classification model comprises a deep full convolution network.

* * * * *